(12) United States Patent
Baumann et al.

(10) Patent No.: US 6,348,667 B2
(45) Date of Patent: Feb. 19, 2002

(54) WIRE ELECTRODE FOR THE SPARK-EROSIVE CUTTING OF HARD METAL

(75) Inventors: Ingo Baumann, Sinn-Fleisbach; Bernd Barthel, Herborn-Merkenbach, both of (DE)

(73) Assignee: Berkenhoff GmbH, Heuchelheim (DE)

( * ) Notice: Subject to any disclaimer, the term of this patent is extended or adjusted under 35 U.S.C. 154(b) by 0 days.

(21) Appl. No.: 09/751,787

(22) Filed: Dec. 29, 2000

(30) Foreign Application Priority Data

Jan. 12, 2000 (DE) .......................... 100 00 858

(51) Int. Cl.[7] ................................. B23H 1/00
(52) U.S. Cl. ...................... 219/69.12; 219/68
(58) Field of Search ................ 219/69.12, 68; 148/240, 282, 501

(56) References Cited

U.S. PATENT DOCUMENTS

| 4,341,939 A | * | 7/1982 | Briffod et al. ........... 219/69 W |
| 4,777,337 A | * | 10/1988 | Inoue ...................... 219/69 W |
| 4,977,303 A | * | 12/1990 | Briffod ..................... 219/69.12 |
| 5,599,633 A | * | 2/1997 | Miyazaki et al. .......... 428/675 |
| 5,916,457 A | | 6/1999 | Ohmi ...................... 219/69.12 |

FOREIGN PATENT DOCUMENTS

| DE | 690 01 618 | 1/1990 |
| EP | 0 182 492 | 5/1986 |

* cited by examiner

Primary Examiner—M. Alexandra Elve
(74) Attorney, Agent, or Firm—Flynn, Thiel, Boutell & Tanis, P.C.

(57) ABSTRACT

A method and a wire electrode for the spark-erosive cutting of hard metal, whereby the wire electrode has a core and at least one outer coat surrounding the core and wearing during cutting. To avoid corrosion, as, for example, pitting, a wire electrode is chosen, the wearing outer coat of which consists of a metal or a metal alloy which is not nobler than the binder contained in the hard metal, and the metal or the metal alloy has an electrode potential which is less than or equal to $\phi_0 = -0.28$ V, referred to a standard hydrogen electrode.

4 Claims, No Drawings

WIRE ELECTRODE FOR THE SPARK-EROSIVE CUTTING OF HARD METAL

FIELD OF THE INVENTION

The invention relates to a method and a wire electrode for the spark-erosive cutting of hard metal comprising a core and at least one outer coating surrounding the core and wearing during cutting.

BACKGROUND OF THE INVENTION

The term hard metal identifies a metal ceramic compound, for example a WC/Co-compound, which has as a characteristic a great hardness and a high resistance to wear, in particular at high temperatures. The hard metal consists of carbides, which are held with a binder, for example Co, Ni, in a structure. The binder can be up to 35% by weight. The binder is mainly needed in order to bond ceramic components like carbides, and lend to the hard metal the necessary toughness during mechanical loads. The carbides, which give the hard metal its extreme hardness and resistance ability, are ceramic-like materials. They have a high resistance to corrosion but, however, are very sensitive to breakage.

For the manufacture of highly precise tools or matrixes it is necessary to work hard metal blocks by means of common methods, for example by grinding or spark erosion. The spark erosion has thereby lately been more and more successful because of its great precision, its versatility and its high degree for automation, in connection with advantageous production costs.

However, it is problematic for the spark-erosive cutting of hard metals that among others pitting phenomena occurs on the not eroded surfaces of the hard metal block. This pitting consists of many small holes on or directly below the surface of the hard metal block. This pitting cannot always be recognized with the naked eye, and the surface of the hard metal block can appear on the outside as being completely sound. However, as soon as the questionable area is subjected to stress due to wear, the previously covered-up holes appear. The holes are created by the corrosion of hard metal This is an electrochemical process which attacks the entire surface of the block dipped into the watery dielectric. The corrosion causes a washing out of the metallic phase of the hard metal, connected with a freeing of the metal contained in the hard metal in the dielectric.

The electrochemical corrosion of hard metals is expressed in a destruction of the hard metal structure, which destruction starts out from the surface. It is based on a dissolving of the binder contained in the hard metal and, if applicable, further metals, The cause is hereby the presence of a second, nobler metal, the standard electrode potential of which is thus higher than the one of the corroding metal of the hard metal. The electromechanical corrosion takes thereby place on the anode of an electrochemical corrosion cell and occurs In the presence of an electrolyte (dielectricum) These conditions exist during the spark-erosive cutting of hard metal.

SUMMARY OF THE INVENTION

The basic purpose of the invention is to provide a wire electrode with which the corrosion, in particular of the not eroded surfaces of the hard metal block is prevented.

DETAILED DESCRIPTION

This purpose is attained according to the invention by selecting a wire electrode for the spark-erosive cutting of hard metals, the wearing outer coat of which consists of a metal or a metal alloy, which is not nobler than the binder contained in the hard metal, and by the metal or the metal alloy having an electrode potential which is less than or equal to $\phi_0 = -0.28V$, referred to a standard hydrogen electrode. Thus, small metal particles of the outer coat come loose during the cutting due to wear of the outer coat of the wire electrode and remain in the dielectric. Since these small metal particles, however, are not nobler than the metal contained in the hard metal, the electrochemical corrosion, namely the pitting of the hard metal, can therefore not occur as soon as the small metal particles come into contact with the hard metal block. Consequently, the pitting phenomena in the hard metal block is avoided.

The hard metal block as a rule contains cobalt. Cobalt has an electrode potential of approximately $\phi_0 = -0.28V$, referred to a standard hydrogen electrode. The metal contained in the wearing outer coat or the metal alloy contained in the wearing outer coat thus have advantageously an electrode potential which is less than or equal to go $\phi_0 = -0.28V$, referred to a standard hydrogen electrode. Thus it can be, for example, aluminum, magnesium, zinc or iron.

The core of the wire electrode according to the invention can consist of a copper alloy or of copper. An outer coat of steel, which outer coat wears at least partially, is applied to such a core. According to the invention, it is possible to apply a zinc coat onto this steel coat. Such a wire electrode is to be utilized in such a manner that only the outer coats wear, not, however, the core.

What is claimed is:

1. A wire electrode for the spark-erosive cutting of a binder-containing hard metal workpiece comprising a core and at least one outer coat which surrounds the core and wears during cutting, wherein the outer coat consists of a metal or a metal alloy which is not nobler than the binder contained in the hard metal workpiece and the metal or metal alloy has an electrode potential less than or equal to $\phi_0 = -0.28V$, based to a standard hydrogen electrode.

2. The wire electrode according to claim 1, wherein the core consists of a copper or a copper alloy covered with an outer coat of iron or an iron alloy.

3. The wire electrode according to claim 2, wherein an outer coat of zinc or zinc alloy is applied to the wire electrode.

4. A method for the spark-erosive cutting of a binder-containing hard metal workpiece by means of a wire electrode having a core and at least one outer coat which surrounds the core and wears during cutting, in which the improvement comprises the outer coat consisting of a metal or a metal alloy which is not nobler than the binder contained in the hard metal workpiece, said metal or metal alloy having an electrode potential no greater than $\phi_0 = -0.28V$, based on a standard hydrogen electrode.

* * * * *